June 18, 1968  F. WIELAND ET AL  3,388,455
METHOD FOR PRESS FITTING MINIATURE TUBING OF VARYING DIAMETERS
Filed Aug. 17, 1967  2 Sheets-Sheet 1

INVENTORS
FRANZ WIELAND
JOSEPH J. COIL

BY Semmes & Semmes
ATTORNEYS 3,388,455
METHOD FOR PRESS FITTING OF MINIATURE
TUBING OF VARYING DIAMETERS
Franz Wieland, Bethlehem, Pa., and Joseph J. Ciol, Parlen, N.J., assignors to Rapidograph, Inc., Bloomsbury, N.J., a corporation of New Jersey
Filed Aug. 17, 1967, Ser. No. 661,311
9 Claims. (Cl. 29—525)

ABSTRACT OF THE DISCLOSURE

Method of press fitting miniature tubing in coaxial alignment, particularly assembling metallic points such as tungsten carbide in stainless steel holders as used in stylographic writing instruments, the diameters of said metallic points being in the range 0.006–0.052 of an inch.

CROSS-REFERENCES TO RELATED APPLICATIONS

Method for Assembling Miniature Tubing (Serial No. 661,372) filed August 17, 1967.

This earlier filed application relates to the assembly of jewel-type points in stainless steel holders by gluing of the jewel and urging the jewel coaxially into a counterbored larger diameter stainless steel tube.

BACKGROUND OF THE INVENTION

Field of the invention

For many years, drafting pen points were manufactured from stainless steel tubing. Recently, however, the use of coated plastic drafting media, which have highly abrasive effects, have dictated the use of pen points less subject to wear. Hard metallic carbides, such as tungsten carbide, and jewel tips have been employed. Both such tips are performing satisfactorily on contemporary drafting media; however, the method of assembly of the tips within the drafting pen holders has been exceptionally imprecise, time consuming and impermanent. Because the hard wearing tungsten carbide or jewel points are exceptionally brittle, previous inventors have discarded attempts at press fitting and have relied on the use of either solder or epoxy to hold the tungsten carbide point in a stainless steel holder or swedging of the metallic holder to hold a jewel tip in place. However, solder is subject to attack by the acetate ink ingredients. If epoxy is used, it requires a heat curing that is damaging to tungsten carbide which has a tendency towards distortion and brittleness through overheating. Also, the use of solder or epoxy requires a time-consuming and expensive secondary inspection.

According to the present invention, the necessity for use of solder or epoxy is eliminated by press fitting a metallic point such as tungsten carbide, into its metallic holder. This press fitting requires maintaining of exceptionally close tolerances in manufacture of both the holder and the metallic tip. By maintaining these tolerances within the precise range of one ten-thousandth of an inch, drafting pens having a diameter in the 0.006 of an inch range can be consistently and accurately produced on a mass scale.

Description of the prior art

Paul 2,600,426: Directed to fitting of jewel points in stainless steel holders wherein a conical jewel point is secured to a metallic capillary tube by means of flaring the capillary tube outwardly at its end so as to overlie the rounded end of the jewel piece. Wear of the jewel tip during use, however, will also abrade the capillary tube flaring, resulting in dislodgement of the jewel tip.

Young 3,292,599: Concerning the mounting of a tubular tungsten carbide tip in a stainless steel holder. Note Column 3, lines 21–24: "As no stress is placed on the thin wall of the (tungsten carbide) tip 34 to retain it in the recess 33, since such retention is by soldering, there is no danger of breaking of the relatively brittle (tungsten carbide) tip during manufacture." The tungsten carbide tip is positioned in the housing recess so as to protrude from the recess by an amount "slightly less than the depth of the recess" and the tip is required to be "bonded" to the tubular support as at 36 by soldering.

Great Britain 1,045: Concerning the fitting of a "drilled jewel" in a gold setting. The drilled jewel is tapered, precluding the writing of a consistently thin line, and, of course, the crimping or fitting of the gold about the face of the jewel would be insufficiently hard to enable use of the tip in drafting in contemporary automated drafting machines.

SUMMARY OF THE INVENTION

According to the present invention, a tungsten carbide tube or like metallic tip is fitted into a tubular stainless steel holder by cutting the tungsten carbide tubing of smaller diameter into the desired length, grinding the smaller diameter tubing to an outer diameter within a tolerance of plus or minus 0.0001 of an inch; radiusing at least an inner end of the smaller diameter tubing to avoid cutting of the stainless steel holder; then forming a housing within the larger diameter stainless steel tubing by drilling inwardly at one end a co-axial bore having an inner diameter 0.0003 to 0.0006 of an inch smaller than the outer diameter of the smaller diameter tungsten carbide tubing, then co-axially aligning the tubing while supporting the larger diameter tubing against horizontal movement and press fitting by horizontally advancing the smaller diameter tubing into the housing of the larger diameter tubing. By carefully cutting, radiusing and chamfering within these tolerances, press fitting of tungsten carbide can be effectively, economically and permanently accomplished.

BRIEF DESCRIPTION OF THE DRAWINGS

FIG. 3 is a vertical sectional exploded view of the metallic carbide tip and stainless steel holder components co-axially aligned prior to press fitting, with a mandrel shown in phantom.

DESCRIPTION OF THE PREFERRED EMBODIMENTS

Figure 1:
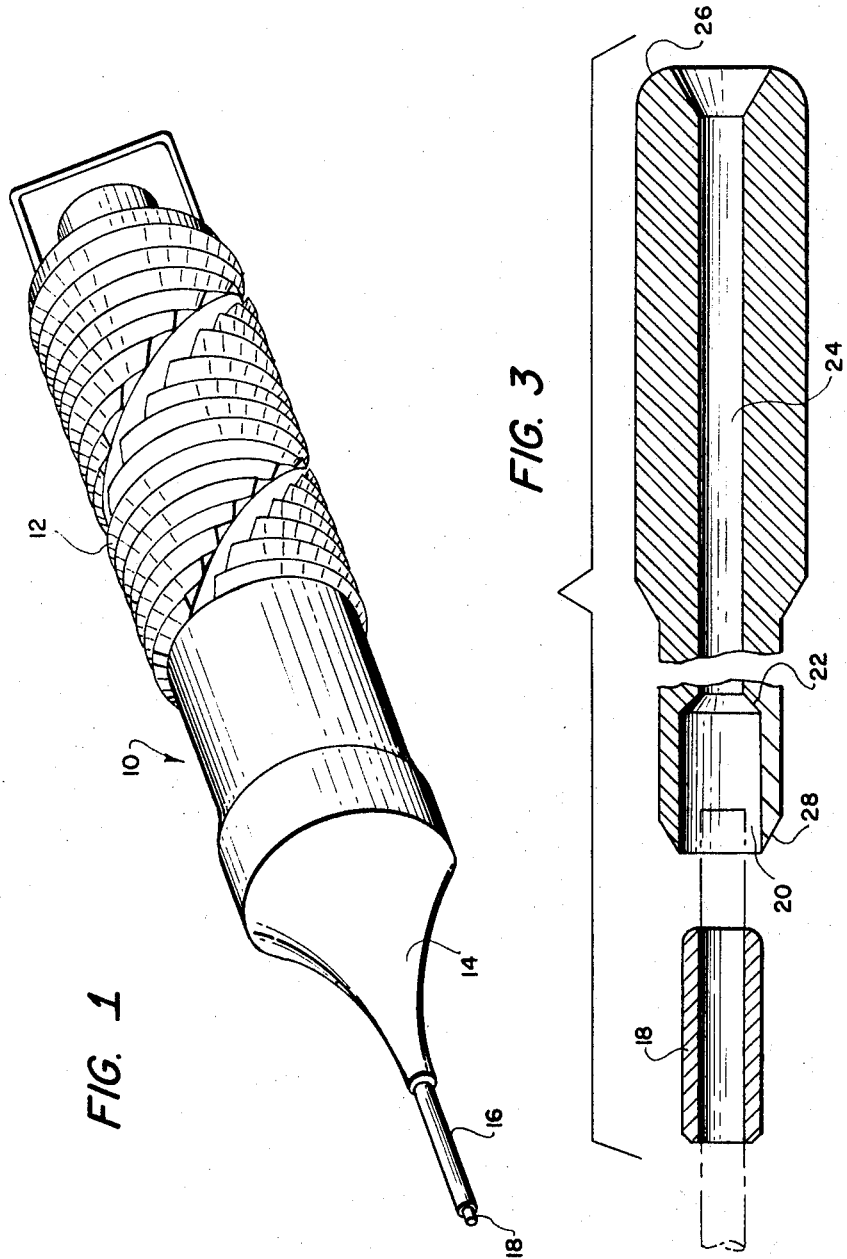
FIG. 1 is a perspective view of a drafting pen holder and tip manufactured according to the present method.

According to the present invention, miniature metallic tubing of varying diameters is press-fitted together. Particularly, metallic or tungsten carbide points are press fitted in stainless steel holders, as employed in drafting pens. In FIG. 1 a drafting pen nib generally designated as 10 and having exterior threads 12 for support in its holder, is illustrated as having a conical point 14 through which the stainless steel holder 16 extends. Tubular tungsten carbide point 18 press fitted within stainless steel holder 16 is shown as protruding slightly therefrom. Ink is fed conventionally through the nib, stainless holder and tungsten carbide tip 18 by means of an axial wire (not illustrated) and its attendant capillary action.

Figure 2:
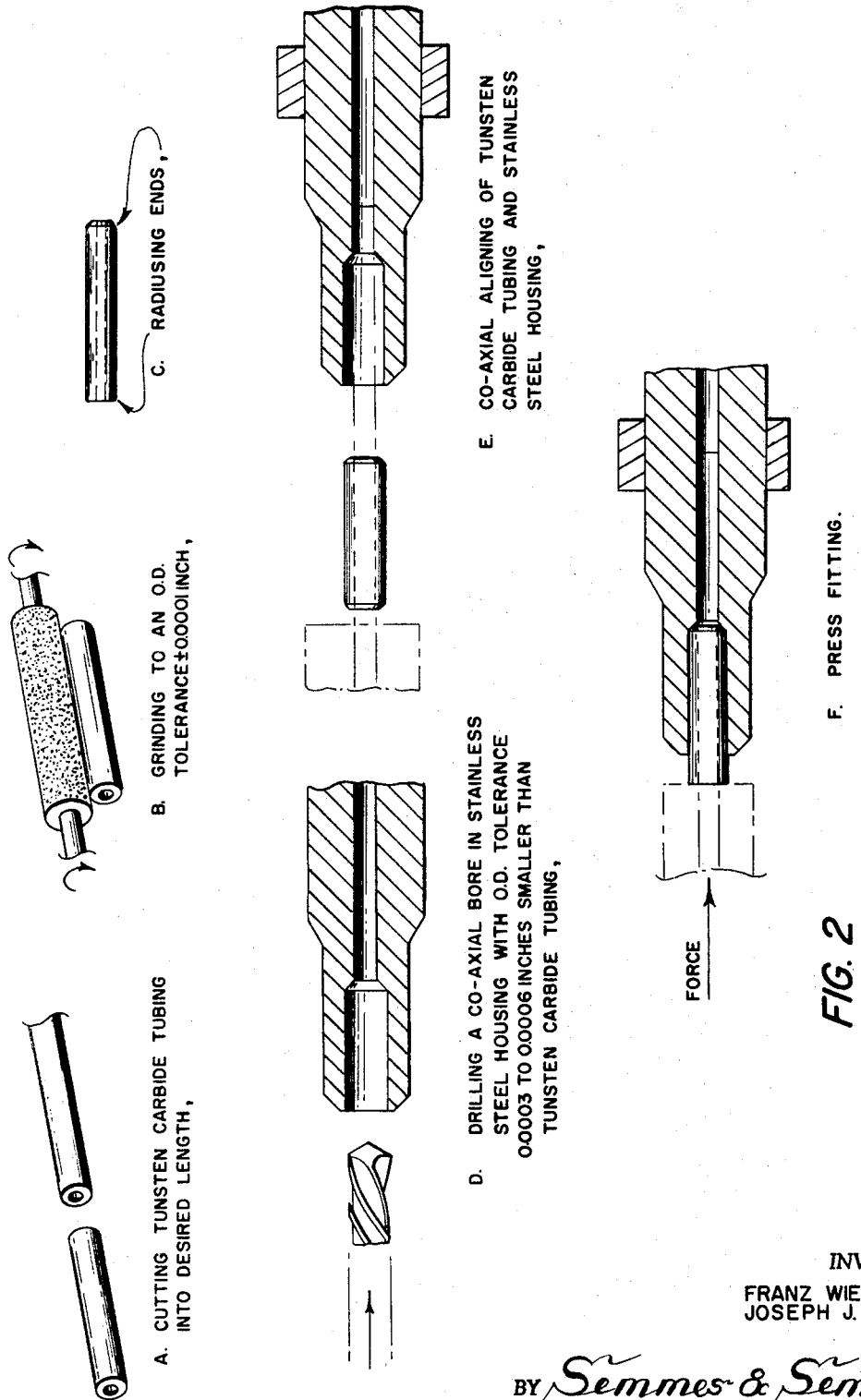
FIG. 2 is a schematic view of the press fitting steps according to the present method.

As illustrated in FIG. 2, tungsten carbide or like metallic carbide tubing is cut up into the desired lengths, for example, 0.030 of an inch at a perfect right angle by means of conventional diamond cutting devices. An inner bore is then reamed in the smaller diameter tubing within a tolerance of plus or minus 0.0002 of an inch, so as to have an interior finish of 4 microns or better. This reaming can be accomplished by conventional diamond dust wire instruments. Tungsten carbide is notorious for its porous and rough characteristics; hence, the necessity for reaming and finishing to the desired degree. Then, the smaller diameter tubing is ground to an outer diameter tolerance of plus or minus 0.0001 of an inch so as to be related to the inside diameter within 0.0002 TIR (total indicator reading).

Sequentially, the housing is prepared from highest quality corrosion resistant stainless steel, the outer diameter of this larger sized diameter being within a tolerance of plus or minus 0.00025 of an inch and the inner diameter being within a tolerance of plus or minus 0.00025 of an inch with 0.0003 TIR.

As illustrated in FIG. 3, a housing 20 is formed in the larger sized diameter stainless steel by drilling inwardly at one end a co-axial bore having an inner diameter 0.0003 of an inch to 0.0006 of an inch smaller than the outer diameter of the tungsten carbide tubing. Then, the inner shoulder 22 intermediate the housing 20 and bore 24 of stainless steel tube is formed with an included angle of 120 degrees. This drilling should be chamferred to remove burrs from the housing and to clean for the next operation. A flat reamer may be inserted into the housing 20 to provide the precise inner diameter size for press fitting of the tungsten carbide tip. Stainless steel housing may then be radiused at its trailing edge 26. The leading edge 28 may be chamferred radially inwardly towards the tungsten carbide tip.

The final step of the present method involves positioning the tungsten carbide tip in a free floating spindle in co-axial alignment with the stainless steel holder which may be supported stationarily in a collet chuck. A wire extending from the spindle through the tungsten carbide tip serves as a mandrel. Then, the tungsten carbide tip is press fitted by horizontally advancing the tungsten carbide tip into the stainless steel housing. The mandrel guide and aligning the tip co-axially with the housing. Cutting, drilling and radiusing of parts within the specified tolerances, together with mandrel alignment enables press fitting with a minimum of pressure.

Since soldering or curing of epoxy are eliminated, the assembly point is then ready for radiusing at its outer end by brushing. Subsequently to radiusing, the parts may be cleaned and assembled into holder 10.

In the FIG. 3, exploded view, a tungsten carbide tip is illustrated as being supported upon the mandrel (shown in phantom) of the free floating spindle and being urged against the stainless steel holder. Dimensions of these particular parts, as well as tolerances have been given for illustrational purposes.

Manifestly, these dimensions may be varied without departing from the spirit and scope of invention, as defined in the sub-joined claims.

We claim:
1. Method for press fitting of miniature metallic carbide tubing of varying diameters, comprising:
(A) cutting a smaller diameter metallic carbide tubing into the desired length;
(B) finishing said smaller diameter tubing to an outer diameter within a tolerance of plus or minus 0.0001 of an inch;
(C) forming a housing within a larger diameter metal tubing by drilling inwardly at one end a co-axial bore 0.0003 to 0.0006 of an inch smaller than the outer diameter of said smaller diameter tubing;
(D) co-axially aligning said smaller diameter tubing and said larger diameter tubing, while supporting said larger diameter tubing against horizontal movement; and
(E) press fitting by horizontally advancing said smaller diameter tubing into the housing of said larger diameter tubing.

2. Method for press fitting of miniature metallic carbide tubing of varying diameters, comprising:
(A) cutting a smaller diameter metallic carbide tubing into the desired length;
(B) reaming an inner diameter bore in said smaller diameter tubing within a tolerance of 0.0002 of an inch;
(C) finishing said smaller diameter tubing to an outer diameter within a tolerance of plus or minus 0.0001 of an inch;
(D) radiusing an inner end of said smaller diameter tubing;
(E) forming a housing within a larger diameter metal tubing by drilling at one end a co-axial bore 0.0003 to 0.0006 of an inch smaller than the outer diameter of said smaller diameter tubing;
(F) co-axially aligning said smaller diameter tubing and said larger diameter tubing while supporting said larger diameter tubing against horizontal movement; and
(G) press fitting by horizontally advancing said smaller diameter tubing radiused end into the housing of said larger diameter tubing.

3. Method for press fitting of miniature tubing of varying diameters as in claim 1, including facing radially inwardly a leading edge of said housing adjacent the area of contact with said smaller diameter tubing.

4. Method for press fitting of tubing of varying diameters, as in claim 3, including cutting a radially inwardly inclined shoulder at the inner end of said housing.

5. Method for press fitting of miniature tubing of varying diameters as in claim 4, including radiusing the trailing edge of said housing.

6. Method for press fitting of miniature tubing of varying diameters as in claim 5, including chamferring of said housing prior to press fitting of said smaller diameter tubing.

7. Method for press fitting of miniature tubing of varying diameters as in claim 6, including finishing the outer diameter of said larger diameter tubing within a tolerance of plus or minus 0.00025 of an inch.

8. Method for press fitting of miniature tubing of varying diameters as in claim 1, including supporting said smaller diameter tubing upon a medial wire extending from a free floating spindle, while securing the larger sized diameter tubing against horizontal movement within a stationary collet chuck.

9. Method for press fitting of miniature tubing of varying diameters, as in claim 1, said radiusing of the inner end of said smaller diameter tubing being in the range 0.001 to 0.002 of an inch so as to prevent sharp corners from cutting the housing.

References Cited

UNITED STATES PATENTS

| | | | |
|---|---|---|---|
| 1,824,249 | 9/1931 | Wallace | 401—259 |
| 2,472,343 | 6/1949 | Rosa | 401—259 |
| 2,598,975 | 6/1952 | Coulter | 29—525 X |
| 2,656,070 | 10/1953 | Linder. | |

CHARLIE T. MOON, *Primary Examiner.*